United States Patent [19]
Yokell

[11] Patent Number: 5,597,276
[45] Date of Patent: Jan. 28, 1997

[54] APPARATUS FOR VENTING TUBES

[76] Inventor: Stanley Yokell, 4390 Caddo Pkwy., Boulder, Colo. 80303

[21] Appl. No.: 282,921

[22] Filed: Jul. 29, 1994

[51] Int. Cl.⁶ .................................................. B23C 3/34
[52] U.S. Cl. ..................... 409/132; 409/143; 409/179; 408/150
[58] Field of Search ................................. 409/131, 132, 409/143, 179, 200; 408/150, 179, 180

[56] References Cited

U.S. PATENT DOCUMENTS

| | | | |
|---|---|---|---|
| 752,728 | 2/1904 | Ulrich . | |
| 1,571,620 | 2/1926 | Bettes . | |
| 1,643,394 | 9/1927 | Smith . | |
| 2,306,670 | 12/1942 | Sutliff | 77/32 |
| 2,461,947 | 2/1949 | Weber | 77/58 |
| 2,670,673 | 3/1954 | Whitechester | 77/55 |
| 3,178,972 | 4/1965 | Beebee | 82/5 |
| 3,482,475 | 12/1969 | Kuceris | 408/150 |
| 4,116,110 | 9/1978 | Dines | 90/12 |
| 4,278,372 | 7/1981 | Heisner | 408/179 |
| 4,307,512 | 12/1981 | Phillips | 30/94 |
| 4,718,201 | 1/1988 | Legge | 51/241 |
| 4,838,742 | 6/1989 | Fricker | 409/131 |
| 4,898,502 | 2/1990 | Becher | 408/72 |
| 4,923,342 | 5/1990 | Kopkie et al. | 409/143 |
| 4,941,781 | 7/1990 | Becher | 408/72 |
| 4,971,486 | 11/1990 | Rinklake et al. | 408/180 |

*Primary Examiner*—David L. Pirlot
*Assistant Examiner*—Daniel Wittels

[57] ABSTRACT

An apparatus is provided to allow a conventional tube grooving tool to be used to create a vent hole in a tube behind the tube sheet of a boiler or other tubular heat exchanger without cutting a hole or grove in the entire circumference of the tube. The apparatus includes an eccentric or a canted guide that is positioned within the end of the tube to guide the tool holder having a grove cutting tool mounted on it. The guide offsets the tool holder and the cutting tool from the centerline of the tube so that the cutting tool only cuts into a portion of the inside surface of the tube.

10 Claims, 4 Drawing Sheets

APPARATUS FOR VENTING TUBES

BACKGROUND OF THE INVENTION

1. Field of the Invention

The present invention relates to tube cutting tools, and more specifically to a method and apparatus for cutting a vent hole in one side of a tube from the inside out and a sufficiently spaced distance from the tube end to produce the vent hole behind a tube sheet in a heat exchanger.

2. Description of the Prior Art

In tubular heat transfer equipment, such as boilers and heat exchangers, where one heat-carrying medium is kept separate from another heat carrying medium by elongated tubes mounted in tube sheets, it is not unusual for tubes to fail during operation. The tube failures are manifested by leaks through the tube wall, which allows the two heat-carrying fluid media to mix. Common industry practice is to design and install heat exchangers with excess tube capacity so that operators can plug both ends of failed tubes to effectively take them out of operation. They can then continue equipment operation without the benefit of the plugged tubes until either the frequency of tube plugging or the number of tubes plugged reduces the heat exchanger capacity to the point where continued operation is uneconomical. The boiler or heat exchanger equipment is then either replaced or retubed. In retubing, the original tubes are removed from the tube sheets and replaced with new ones.

After tubes have been plugged, it is not unusual for the leaks to become sealed by corrosion products, mineral deposits, or process fluids when the pressure differentials in operating tubes are no longer present. As a result, some fluid may become trapped within the tube. Such trapped fluid in a plugged tube creates a hazard during subsequent repair or salvage operations, because heat from an acetylene torch, welder, carbon arc cutter, or even an abrasive saw can cause a sufficient pressure build-up in the tube to cause a plug to blow out with potentially lethal force. Furthermore, a tube can contain noxious fumes or fluids that can be injurious when heated and released from the tube.

Consequently, safe plugging of a leaking or otherwise defective tube requires creating an opening in the tube wall behind the tube sheet or the tube sheet that is large enough to ensure the free flow of fluid surrounding the tube into and out of the tube's interior to adequately vent any entrapped fluid and to prevent any pressure build-up in the tube. However, perforating, cutting, or otherwise penetrating the tube behind the tube sheet is not an easy task, because there is no access to the tube wall behind the tube sheet without completely disassembling the heat exchanger. A common practice is to try to pierce the tube wall from the inside by inserting a rod with a hooked, sharp-pointed end into the tube a sufficient distance to reach beyond the tube sheet and then jamming the point into the tube wall. However, this technique is not always successful due to the tube wall thickness, the material composition of the tube, and the dimensions of the tube and tube sheet.

Devices for completely cutting the tube behind the tube sheet are well known in the art and have been used for this purpose. For example, U.S. Pat. No. 752,728 to Ulrich discloses an internal tool for cutting through an entire pipe. However, completely severing the tube behind the tube sheet, while it solves the pressure problem, is not entirely satisfactory, either. A loose end of the severed tube can collide with, vibrate against, and damage adjacent tubes in the heat exchanger.

Internally operating devices are also well known in the art for cutting internal grooves in a cylindrical object, see U.S. Pat. No. 3,178,972 to Beebee, and for cutting perforations in pipes, see U.S. Pat. No. 1,643,394 to Smith and U.S. Pat. No. 2,306,670 to Sutliff. However, none of those devices are particularly practical, easy to use, or effective for the purpose of venting heat exchanger tubes behind a tube sheet, and there is a need for a simple, but practical and effective solution to that problem.

SUMMARY OF THE INVENTION

Accordingly, it is a general object of this invention to provide an improved method and apparatus for creating vent holes in a tube of a heat exchanger behind the tube sheet.

A more specific object of the invention is to provide a method and apparatus for making an aperture in the wall of a heat exchanger tube behind the tube sheet from the interior of the tube and by access through an end of the tube.

Another specific object of the invention is to provide a method and apparatus for making a large aperture in a wall of a tube from the inside of a tube and in a manner that does not completely sever one portion of the tube from the remainder of the tube.

An even more specific object of the invention is to provide a method and apparatus for creating a large aperture in one side of a tube wall from the interior of the tube while leaving intact the side of the tube wall that is diametrically opposite the aperture.

To achieve the foregoing and other objects and in accordance with the purposes of the present invention, as embodied and broadly described therein, the invention includes an eccentric metal bushing with a body that has its exterior surface machined or otherwise shaped for a slide fit into the open end of a tube to be vented, and an eccentric bore through the body with axis that is parallel, but offset radially from the longitudinal axis of the tube. A concentric groove wide and deep enough to clear any tube protrusion can be machined into the shoulder where it bears against the tube sheet face. The eccentric bore in the bushing has a diameter large enough to accommodate a commercial cutting or grooving tool. The centerline or axis of the bore is offset from the centerline or axis of the tube preferably at a distance greater than the tube wall thickness. The offset bore places the tool centerline, about which the cutting tool rotates, at a position that causes it to cut completely through a portion of the tube sidewall while leaving the remaining diametrically opposite portion of the tube sidewall intact.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention. In the Drawings.

DETAILED DESCRIPTION OF THE PREFERRED EMBODIMENTS

Figure 1:
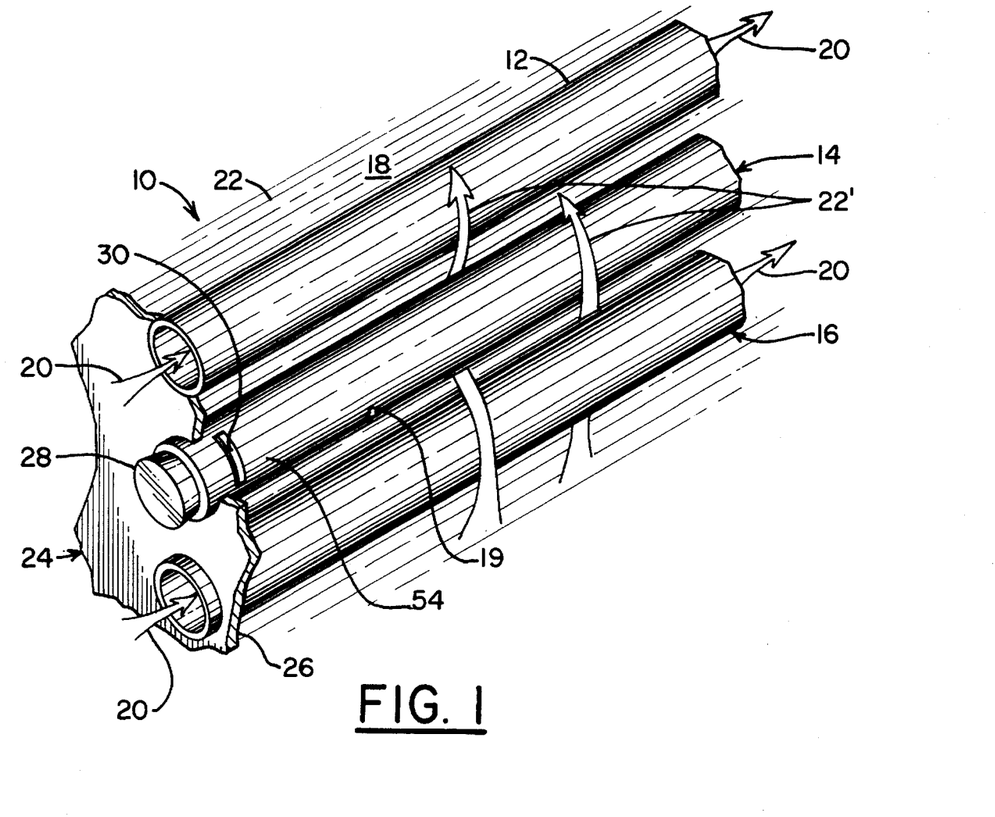
FIG. 1 is a view of the end portions of three representative tubes supported by a typical tube sheet in a conventional heat exchanger structure with the middle tube shown plugged in a conventional manner, but with a slotted aperture cut through the sidewall according to this invention.

As illustrated in FIG. 1, conventional tubular heat exchangers 10 have a bank of many tubes of which tubes are representative illustrations, 12, 14, 16 extending through a chamber 18. A first fluid 20 flowing through the tubes 12, 14, 16 transfers heat through the walls of the tubes 12, 14, 16 to or from a second fluid 22 in the chamber 18 without allowing the fluids 20, 22 to contact or mix with each other. For example, but not for limitation, when the heat exchanger 10 is part of a boiler for producing steam, it is typical for hot gases of combustion to be the second fluid 22 in the chamber 18 while water to be converted to steam comprises the first fluid 20 flowing through the tubes 12, 14, 16. The chamber 18 is filled with the hot gases 22 so that the hot gases 22 surround the tubes 12, 14, 16. Since many heat exchanger applications utilize hot gases in the chamber 18, this chamber 18 may also be called gas plenum 18. However, this interchangeable terminology should not be construed as limiting the chamber 18 to use as a gas plenum, since it could also contain a liquid, steam, or other fluids just as well. The water manifold 24 is separated from the gas plenum or chamber 18 by a tube sheet 26, which is typically a metal plate that also mounts and supports the ends of tubes 12, 14, 16. A complementary tube sheet (not shown) is positioned at the opposite ends (not shown) of tubes 12, 14, 16 to support the opposite ends of tubes 12, 14, 16 and to enclose the opposite side of the chamber 18. Hot gases created by the combustion of fossil fuels or otherwise heated, such as by nuclear reactions, solar energy, or the like, flow through the gas plenum 18 around the tubes 12, 14, and 16, as indicated by the arrows 22. Heat from the gases 22 is conducted through the sidewalls of the robes 12 and 16 to the water or other fluid 20 that flows through those tubes.

Tube 14 is shown with a plug 28 inserted into one end in a conventional manner to close or plug the tube 14 to the manifold 24 after the tube 14 has developed a leak through its sidewall 54, as illustrated at 19, into the chamber 18. In such circumstances, a similar plug (not shown) is also inserted into the opposite end of tube 14 to isolate tube 14 from the flow of fluid from the manifold 24 to prevent further leakage. Disassembly of the heat exchanger 10 enough to access and repair the actual leak 19 in tube 14 would be impractical, especially where there are hundreds or even thousands of tubes in the heat exchanger. The result of plugging both ends of tube 14 in this matter is to take the tube 14 with the leak 19 out of service, but the heat exchanger 10 usually has sufficient capacity to continue functioning with its remaining nonleaking tubes. Eventually, as more leaks occur and more tubes are plugged and out of service, it may become economically feasible to disassemble the heat exchanger 10 for a complete repair of many leaking tubes all at once.

The tube 14 is shown in FIG. 1 with a vent hole 30 cut through its sidewall 54 according to this invention in a portion of the robe 14 that is in the gas plenum 18 on the opposite side of the tube sheet 26 from the manifold 24 and plug 28. This vent hole 30 is cut through the sidewall 54 of tube 14 before the plug 28 is inserted into the end of tube 14 to be sure the inside of robe 14 remains in the same pressure environment as gas plenum 18 in the event the leak 19 becomes plugged again from corrosion, mineral deposits, or from some other physical or chemical action while it is out of service. Otherwise, such physical or chemical resealing of the leak 19 while the plugs 28 are in place could capture liquids or noxious gases and seal them in the tube 14. Then, if the disassembly of the heat exchanger 10 includes processes or operations that concentrate enough heat on the tube 14, such as from a cuffing torch, such heat can cause a pressure build-up in tube 14 sufficient to blow the plug 28 out of the end of tube 14. A blow-out of plug 28 from tube 14 with enough force to critically or even fatally injure someone. Cutting a larger vent hole 30 in the sidewall 54 of tube 14 that is too large to be resealed by corrosion, deposits, or the like can prevent such a pressure build-up inside tube 14 that could blow out the plug 28.

Figure 2:
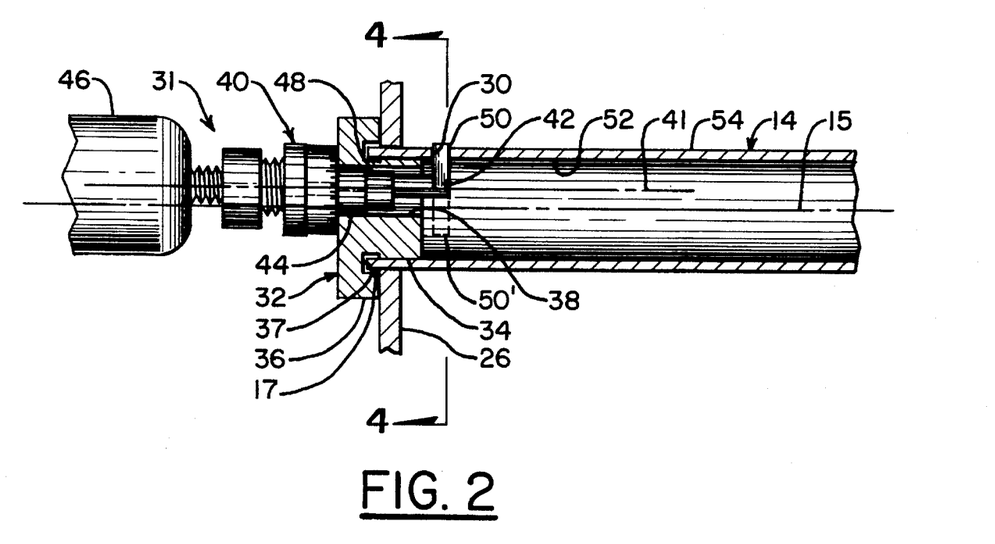
FIG. 2 is a cross-sectional view of an end of a heat exchanger tube with the eccentric guide of this invention, also in cross-section, and a cutting tool positioned in the end of the tube for cutting an aperture according to this invention.
Figure 3:
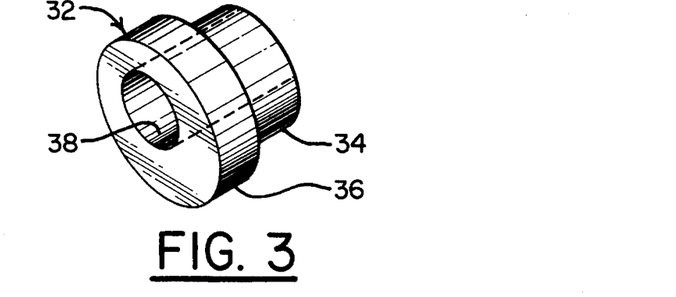
FIG. 3 an isometric view of the eccentric guide of this invention.

The vent hole 30 is cut, according to this invention, through the sidewall 54 of tube 14 at a location just inside the chamber 18 adjacent the tube sheet 26. Vent cutting apparatus 31 using an eccentric guide 32 according to this invention and a conventional groove cutting tool 42 is shown in FIG. 2. The eccentric guide 32 is inserted into the end of tube 14. The shank portion 34 of the eccentric guide 32 is sized and preferably machined to slip snugly into the end of tube 14 until the flange portion 36 abuts either the end of tube 14 or, preferably, the tube sheet 26 for stability. An annular recess 37 in the face of flange 36 can be provided to accommodate a protruding end 17 of the tube 14, as shown in FIG. 2, to allow the rest of the flange 36 to abut tube sheet 26. An eccentric bore 38 extends through the length of eccentric guide 32 and is used to position and guide a grooving tool holder 40 in eccentric relation to the longitudinal axis 15 of the tube 14. Such grooving tool holders 40 with groove cutting tools 42 adapted for use with a power tool driver, such as an electric or pneumatic drill motor 46, are well-known in the art and readily available from commercial manufacturers. For example, the structure and use of such grooving tools manufactured by Bokum Tool Company, Inc., of Madison Heights, Mich., and sold under the trademark "Bokumatic" for cuffing anchor grooves in tube sheets is shown and described in detail in pages 190–191 of my textbook, entitled "A Working to Shell-and-Tube Heat Exchangers", published in 1990 by McGraw-Hill Publishing Co., New York, N.Y.

The cutting tool 42 mounted in the tool holder 40 when used to cut a vent hole 30 in a tube 14 according to this invention is inserted through the eccentric bore 38 in guide 32 until the cylindrical guide surface 44 is seated within the bore 38 and the cutting tool 42 extends far enough into the tube 14 to clear the tube sheet 26. The tool holder 48 and cutting tool 42 are rotated by the action of the pneumatic or electric drill motor 46, while the tool holder guide surface 44 and the eccentric bore 38 maintain the tool holder 40 in an axial alignment 41 that is substantially parallel to, but radially offset from, the longitudinal axis 15 of tube 14. The cutting tip 50 of cutting tool 42 has to be in a retracted position for its insertion through eccentric bore 38. Once inserted, however, the cutting tip 50 can be extended radially while the cutting tool 42 rotates about axis 41 with any of a variety of mechanisms well-known in the art, such as the Bokumatic (trademark) grooving tool holder described above. When the cutting tip 50 is extended radially and rotated about the axis 41 of eccentric guide 32, it cuts into and through the sidewall 54 of tube 14 while never contacting the inside surface 52 radially opposite the cut 30, as illustrated by the phantom lines 50' in FIG. 2.

Figure 4:
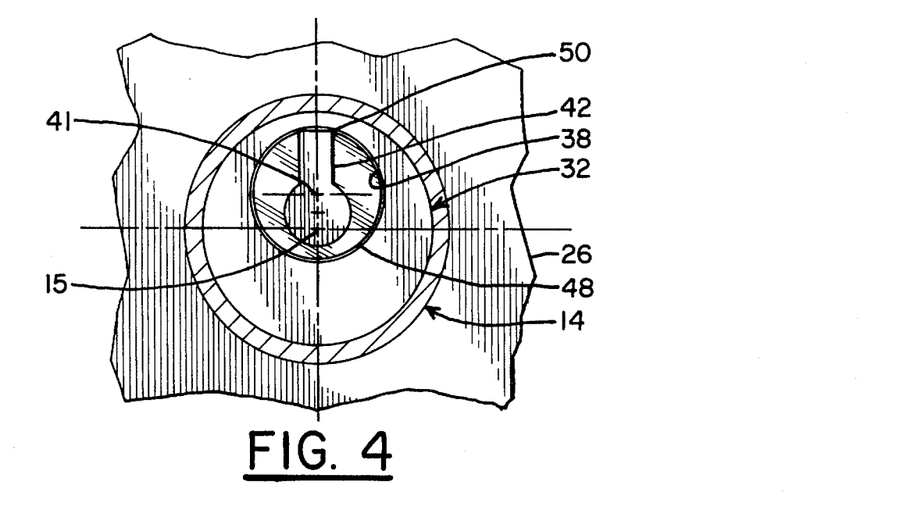
FIG. 4 is a cross-sectional view of a robe taken along lines 4—4 of FIG. 2 showing the cutter tool in its retracted position, such as immediately after insertion of the tool into the eccentric guide of this invention in the end of the tube.
Figure 5:
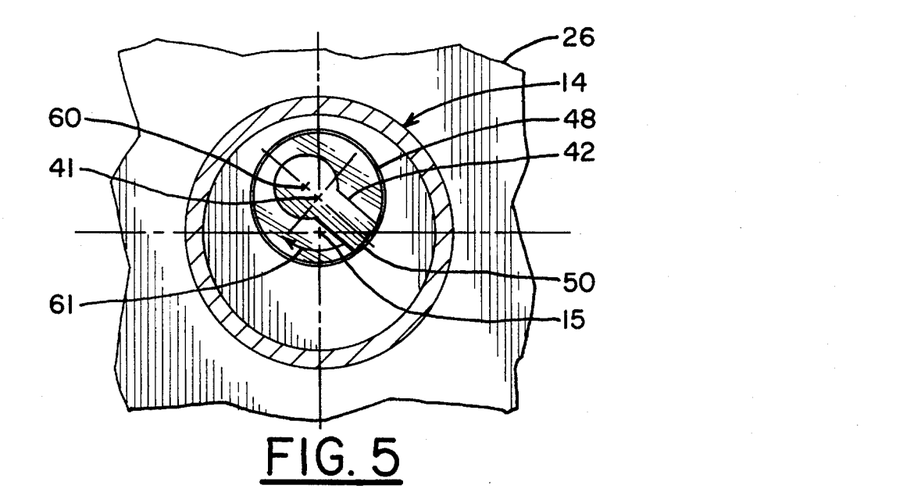
FIG. 5 is a cross-sectional view of the robe similar to FIG. 4, but with the retracted cutter tool rotated within the eccentric guide to illustrate how the cutter tool rotates within the eccentric cutter guide of the present invention.

During normal operation when using grooving apparatus 40, such as the Bokumatic (trademark) described above, with the eccentric guide 32 according to this invention, the user places axial force on the drill motor 46, which is transferred to the tool holder 40 as tool holder 40 bears immovably against the eccentric guide flange 36 on tube sheet 26. An increase in such axial force causes the cutting tip 50 of tool 42 to be displaced radially outward from the centerline or axis 41 of the tool holder 40 and eccentric guide 32. For example, as shown in FIG. 4 along with reference to FIG. 2, the cutting tip 50 of tool 42, when retracted, does not extend radially beyond the eccentric bore 38 of guide 32, so it can be inserted through the bore 38 into the interior of the tube 14. Rotation of the cutting tool 42 in its holder 48 about the axis 41 of eccentric bore 38, as indicated by arrow 61 in FIG. 5, with the cutting tip 50 still retracted results in no cutting. However, as described above, exertion of axial force on the drill motor 46 causes extension of the cutting tip 50 radially beyond the support 48 and bore 38, as illustrated in FIG. 6.

Figure 6:
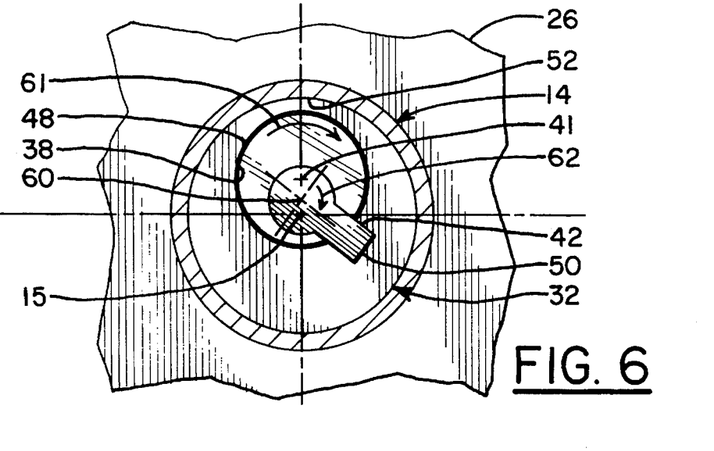
FIG. 6 is a cross-sectional view of the tube similar to FIG. 5, but with the cutter tool in a partially extended position.
Figure 7:
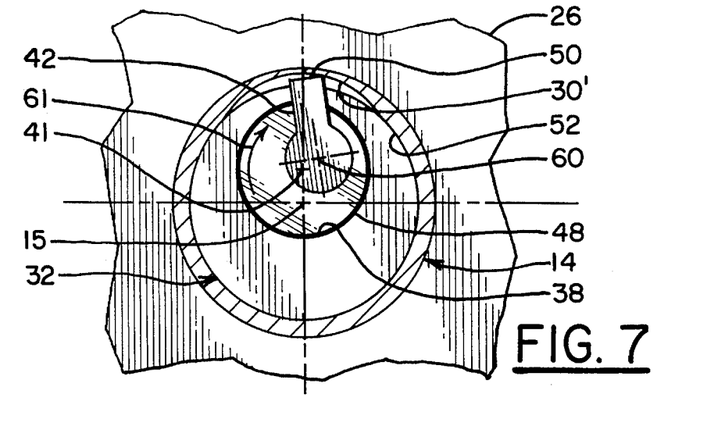
FIG. 7 is a cross-sectional view of the tube similar to FIG. 6, but with the partially extended cutter tool shown rotated within the eccentric cutter tool guide cutting a slot partially through the wall of the tube.
Figure 8:
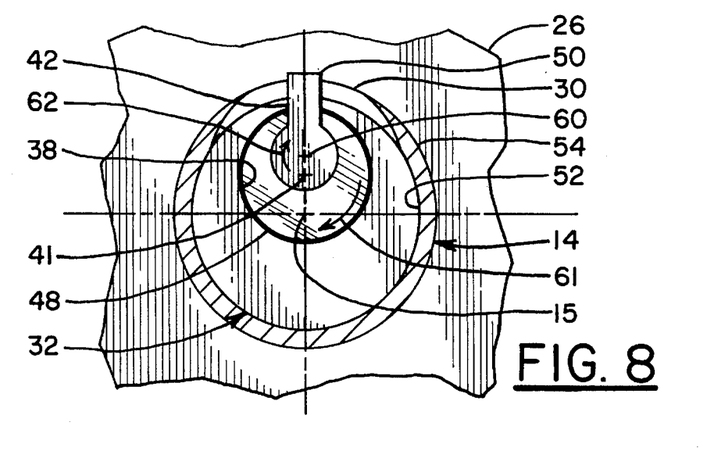
FIG. 8 is a cross-sectional view of the tube similar to FIG. 7, but with the cutter tool fully extended and cutting a slot entirely through a portion of the wall of the tube.

Although not a part of this invention, but for purposes of explanation, some grooving tool holders 40 have the cutting tool 42 mounted eccentrically in the support shaft 48 and a mechanism (not shown) that rotates the tool, 42 within the support shaft 48 about an eccentric axis 60, as indicated by arrow 62 in FIG. 6. This rotation 62 of tool 42 about eccentric axis 60, less than one-half turn causes the cutting edge 50 to protrude radially beyond the eccentric bore 38 toward the inside surface 52 of the tube 14. Therefore, rotation 61 of the tool support 48 by drill motor 46 about axis 41 after or simultaneously with less than one-half turn 62 of tool 42 about the axis 60 results in moving the cutting tip 50 of tool 42 into an orbit around the centerline of the tool holder 40. With enough axial force applied on the drill motor 46 and enough radial displacement of the cutting tip 50, the cutting tip 50 begins to cut a groove 30' into the inside surface 52 of the tube 14 as shown in FIG. 7. Eventually, with further force, thus further rotation 62 and consequent radial extension of tool 42, along with many revolutions of the support shaft 48 and tool 42 about axis 41, the cutting tip 50 cuts a vent hole 30 through the sidewall 54 as shown in FIG. 8. Since the eccentric guide 32 creates and maintains an eccentric offset for the rotation 61 of cutting tip 50, the tube 14 is not bored or grooved around the entire circumference of inside surface 52, and it does not sever the entire tube sidewall 54. Instead, it just cuts a large vent hole 30 in the form of an elongated slot through one portion of the sidewall 54 of tube 14. The eccentric offset or radial distance between tube axis 15 and tool axis 41 may vary somewhat, depending on the radial extension capability of the cutting tool apparatus being used, but it should be at least as thick as the sidewall of the tube, yet not so much as to allow the fully extended tool tip 50 to reach adjacent tubes 12, 16 so as to avoid inadvertent damage to such adjacent tubes 12, 16 when cutting the vent hole 30 in tube 14.

After the vent hole 30 is created in tube 14 behind the tube sheet 26, the tool 42 and the eccentric guide 32 can be removed. A plug 28 can then be installed in the end of tube 14. The vent hole 30 will prevent any pressure build up in the plugged tube 14 in the vent the original leak 19 gets sealed over by scale, corrosion, or other deposits.

Figure 9:
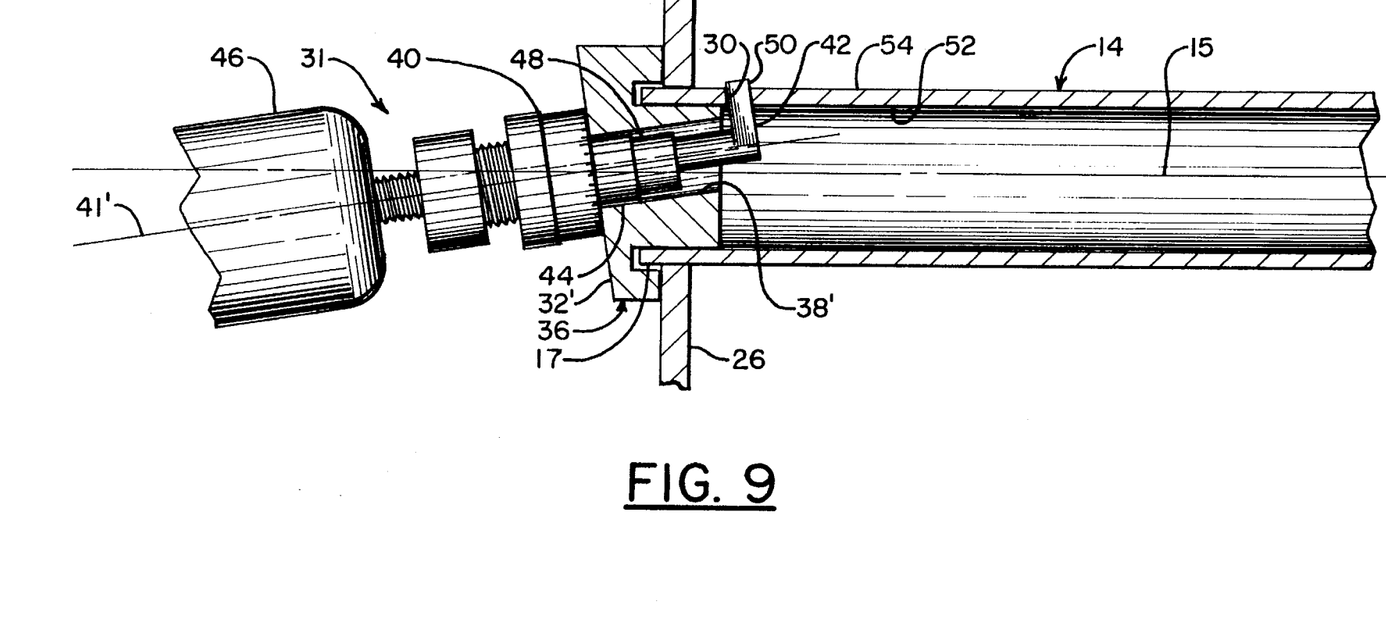
FIG. 9 is a cross-sectional view similar to FIG. 2, but illustrating an alternate configuration of the eccentric guide of this invention.

As mentioned above, any of a number of commercially available, radially displaceable grooving tools can be used with this invention, some of which may have better or more easily useable drives and radial displacement mechanisms than that described above. It is the use of such grooving tools in combination with the eccentric guide 32 for cutting a groove or hole through only part of the tube sidewall 54 circumference that comprises this invention, not the particular grooving tool or apparatus used. The guide 32 can be fabricated of any suitable rigid material, but a self-lubricating material, such as oilite bronze or even just brass or plastic, is preferred. Also, while the parallel axis eccentric guide 32 described above is the preferred configuration, it is not necessarily the only configuration according to this invention. For example, the modified guide 32' shown in FIG. 9 has a guide bore 38' with an axis 41' that is canted in relation to the axis 15 of the tube 14, which also serves the function of positioning the rotating cutting tool 42 in radial offset relation to the axis 15 for cutting through one portion of the sidewall 54 described above.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A method of cutting a vent hole in a sidewall of an elongated tube, wherein the sidewall is substantially concentric with a longitudinal axis of the tube and wherein the tube has an accessible open end, comprising the steps of:

inserting a guide comprising a body with a bore that has a longitudinal axis extending through the body into the open end of the tube with the body bearing on the sidewall of the tube in such a manner that the bore is positioned and maintained in eccentric relation to the tube with the longitudinal axis of the bore oriented substantially parallel to and radially offset from the longitudinal axis of the tube;

inserting an elongated, rotatable cutting tool with a radially extendable and retractable cutting tip through said bore in said guide a sufficient distance such that the cutting tip protrudes into said tube beyond said guide while a portion of the cutting tool remains in the bore in the guide;

rotating the cutting tool about the longitudinal axis of the bore while maintaining the guide stationary in relation to the tube and slowly extending the cutting tip radially into contact with a portion of the sidewall of the tube that is closest to a linear extension of the longitudinal axis of the bore and continuing to rotate the cutting tool in the bore while maintaining the guide stationary in relation to the tube and also continuing to extend the cutting tip radially and allowing the cutting tip to cut into the sidewall until the cutting tip cuts and extends entirely through the portion of the sidewall that is closest to the linear extension of the longitudinal axis of the bore.

2. The method of claim 1, including the step of positioning the guide such that the longitudinal axis of the bore is offset from the longitudinal axis of the tube by a distance at least as large as the thickness of the portion of the sidewall of the tube that is closest to the linear extension of the longitudinal axis of the bore.

3. The method of claim 1, including the step of continuing to rotate the cutting tool while also continuing to extend the cutting tip radially beyond the portion of the sidewall of the tube that is closest to the linear extension of the longitudinal axis of the bore and allowing the cutting tip to cut away and through additional portions of the sidewall that are not closest to the linear extension of the longitudinal axis of the bore.

4. A method of cutting a vent hole in a sidewall of an elongated tube, wherein the sidewall is substantially concentric with a longitudinal axis of the tube and wherein the tube has an accessible open end, comprising the steps of:

inserting a guide comprising a body with a bore that has a longitudinal axis extending through the body into the open end of the tube with the body bearing on the sidewall of the tube in such a manner that the bore is positioned and maintained in canted relation to the tube with the longitudinal axis of the bore oriented at an angle to the longitudinal axis of the tube;

inserting an elongated, rotatable cutting tool with a radially extendable and retractable cutting tip through said bore in said guide a sufficient distance such that the cutting tip protrudes into said tube beyond said guide while a portion of the cutting tool remains in the bore in the guide;

rotating the cutting tool about the longitudinal axis of the bore while maintaining the guide stationary in relation to the tube and slowly extending the cutting tip radially into contact with a portion of the sidewall of the tube that is closest to a linear extension of the longitudinal axis of the bore and continuing to rotate the cutting tool in the bore while maintaining the guide stationary in relation to the tube and also continuing to extend the cutting tip radially and allowing the cutting tip to cut into the sidewall until the cutting tip cuts and extends entirely through the portion of the sidewall that is closest to the open end of the bore that is inside the tube.

5. In a heat exchanger comprising a plurality of elongated, hollow tubes mounted in and extending between two spaced apart tube sheets with the tube ends opening adjacent one side of a tube sheet, method of cutting a vent hole in a sidewall of such an elongated tube adjacent the opposite side of the tube sheet from the open end of the tube, and wherein the sidewall is substantially concentric with a longitudinal axis of the tube and wherein the open end of the tube accessible, comprising the steps of:

inserting a guide comprising a body with a bore that has a longitudinal axis extending through the body into the open end of the tube with the body bearing on the sidewall of the tube in such a manner that the bore is positioned and maintained in eccentric relation to the tube with the longitudinal axis of the bore oriented substantially parallel to and radially offset from the longitudinal axis of the tube;

inserting an elongated, rotatable cutting tool with a radially extendable and retractable cutting tip through said bore in said guide a sufficient distance such that the cutting tip protrudes into said tube beyond said guide and beyond the opposite side of the tube sheet while a portion of the cutting tool remains in the bore in the guide;

rotating the cutting tool in the bore while maintaining the guide stationary in relation to the tube and slowly extending the cutting tip radially into contact with a portion of the sidewall of the tube that is closest to a linear extension of the longitudinal axis of the bore and continuing to rotate the cutting tool in the bore while maintaining the guide stationary in relation to the tube and also continuing to extend the cutting tip radially and allowing the cutting tip to cut into the sidewall until the cutting tip cuts and extends entirely through the portion of the sidewall that is closest to the linear extension of the longitudinal axis.

6. Apparatus for cutting a vent hole through a portion of a sidewall of an elongated tube that has an open end and longitudinal axis while leaving a portion of the sidewall that is diametrically opposite the vent hole intact, comprising:

a guide piece comprising a body sized and adapted for insertion into the open end of the tube and bearing against the sidewall of the tube in a manner that maintains the body radially immoveable in relation to the longitudinal axis of the tube, said body having a bore with a longitudinal axis extending through said body in eccentric relation to the sidewall of the tube when the body is inserted into the tube and wherein the bore is oriented with its longitudinal axis positioned substantially parallel to and radially offset from the longitudinal axis of the tube;

a rotatable cutting tool with a radially extendable and retractable cutting tip adapted for insertion into said bore a sufficient distance such that the cutting tip protrudes into said tube beyond said body;

drive means connectable to said cutting tool for rotating said cutting tool in said bore as the guide is maintained stationary in relation to the tube; and extension means connected to said cutting tip for radially extending or retracting said cutting tip while the cutting tool is being rotated by the drive means.

7. The apparatus of claim 6, wherein said longitudinal axis of said bore is offset from said longitudinal axis of said tube by a distance at least as large as the thickness of the sidewall of the tube through which said vent hole is to be cut.

8. The apparatus of claim 6, wherein said guide piece also has a flange extending radially outward from said body for abutting said open end of said tube when said body is inserted into said tube.

9. The apparatus of claim 6, wherein said cutting tip is retractable to an extent that allows insertion of said cutting tip through said bore and into said tube beyond said body and extendable to an extent that allows cutting and protrusion of said cutting tip through a portion of said sidewall that is closest to a linear extension of the longitudinal axis of the bore.

10. Apparatus for cutting a vent hole through a portion of a sidewall of an elongated tube that has an open end and longitudinal axis while leaving a portion of the sidewall that is diametrically opposite the vent hole intact, comprising:

a guide piece comprising a body sized and adapted for insertion into the open end of the tube and bearing against the sidewall of the tube in a manner that maintains the body radially immoveable in relation to the longitudinal axis of the tube, said body having a bore with a longitudinal axis extending through said body in canted relation to the sidewall of the tube when the body is inserted into the tube and wherein the bore is oriented with its longitudinal axis positioned substantially canted to the longitudinal axis of the tube;

a rotatable cutting tool with a radially extendable and retractable cutting tip adapted for insertion into said bore a sufficient distance such that the cutting tip protrudes into said tube beyond said body;

drive means connectable to said cutting tool for rotating said cutting tool in said bore as the guide is maintained stationary in relation to the tube; and extension means connected to said cutting tip for radially extending or retracting said cutting tip while the cutting tool is being rotated by the drive means.

* * * * *

UNITED STATES PATENT AND TRADEMARK OFFICE
CERTIFICATE OF CORRECTION

PATENT NO. : 5,597,276
DATED : January 28, 1997
INVENTOR(S) : Stanley Yokell

It is certified that error appears in the above-indentified patent and that said Letters Patent is hereby corrected as shown below:

In column 3, line 3, change "robe" to --tube--

In column 3, line 7, change "robe" to --tube--

In column 3, line 57, change "robes" to --tubes--

In column 4, line 17, change "robe" to --tube--

In column 4, line 26, change "cuffing" to --cutting--

In column 4, line 57, change "cuffing" to --cutting--

In column 5, line 1, change "cuffing" to --cutting--

Signed and Sealed this

Second Day of September, 1997

Attest:

BRUCE LEHMAN

Attesting Officer

Commissioner of Patents and Trademarks